H. L. TRIPOD.
CROSSCUT SAW HANDLE.
APPLICATION FILED MAR. 12, 1915.

1,247,181.

Patented Nov. 20, 1917.

Inventor:
Henry L Tripod

UNITED STATES PATENT OFFICE.

HENRY L. TRIPOD, OF RISON, ARKANSAS.

CROSSCUT-SAW HANDLE.

1,247,181.  Specification of Letters Patent.  Patented Nov. 20, 1917.

Application filed March 12, 1915. Serial No. 14,000.

*To all whom it may concern:*

Be it known that I, HENRY L. TRIPOD, a citizen of the United States, residing at Rison, county of Cleveland, State of Arkansas, have invented new and useful Improvements in Crosscut-Saw Handles, of which the following is a specification.

This invention relates to a handle adapted to hold a saw. The structure of the invention consists in few parts, is simple to make, and cheap to manufacture. The saw which is held by the handle may be quickly and easily detached by my invention.

With this and other objects in view, the invention resides in the novel features of construction, combination and arrangement of parts which will be more particularly pointed out in the appended claim.

In the drawings, Figure 1 is a view of the closed handle when in use.

On the drawings in which the same part is designated by the same reference numeral:—

Figure 1:
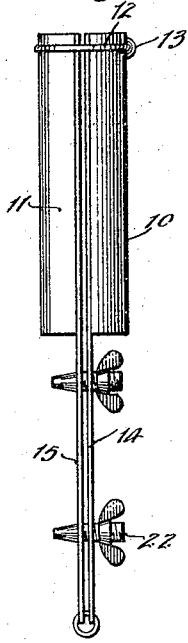

Number 10 refers to one part of the handle and number 11 the other part. These handles are connected by a ring 12. The part 10 has a semi-circular ring 13 attached thereto to the ring 12 and is adapted to swing. Part 10 has a shank 14 connected thereto. Part 11 has a shank 15 connected thereto. The bottom of these shanks have eyes 16 through which one or more connecting rings 17 are adapted to be passed. Part 10 is connected to the upper end of shank 14 by rivets 18. Part 11 is connected to the upper end of shank 15 and by rivets 19. Each shank 14 and 15 has slots 20 and 21, said slots being adapted to receive pins 22.

Figure 3:
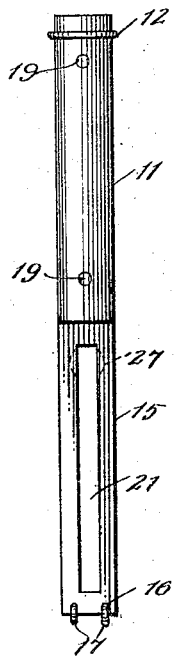
Fig. 3 is a side view of the same handle having the nuts removed.
Figure 5:
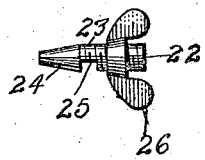
Fig. 5 is an enlarged view of the pin and wing nut.
Figure 4:
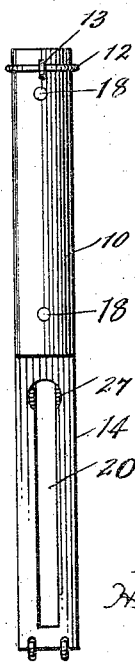
Fig. 4 is a view taken from the other side of Fig. 3.

As clearly shown in Fig. 5 the pin is screw-threaded on one end as shown in 23 and the bottom 24 of the pin is of frusto-conical shape. The screw-threaded part 23 has a notch 25 therein and threaded to the screw-threaded part is a wing nut. A wing nut 26 is screw-threaded on the pin. The pin and wing nut is adapted to ride in slot 21 and the slot has a cut away portion 27 as shown in Fig. 4 and as shown in dotted lines in Fig. 3.

Figure 2:
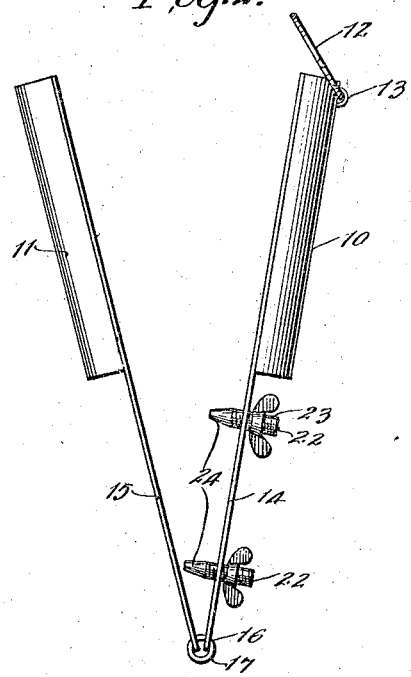
Fig. 2 is a view of the handle showing the same open.

The saw is adapted to now be attached to the handle and if there is any danger of the saw being caught in the timber while sawing it is only necessary to raise the ring off the handle as shown in Fig. 2 which releases the saw from the handle in an instant thereby preventing the saw from being broken by drawing it up through the kerf. The reason the pin is shaped as it is is for the purpose of having it fit different sized apertures or holes in different makes of saws. It is believed from the foregoing description the object of the invention is clear and a more detailed description is omitted.

In reduction to practice, I have found that the form of my invention illustrated in the drawings and referred to in the above description as the preferred embodiment is the most efficient and practical, yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention as defined in the appended claim.

Having described my invention what I claim is:

A saw-handle comprising two handle members, each member having an elongated shank connected thereto, an end of each shank having apertures therein, said apertures holding eyes to connect said shanks, one of said handles having a semi-circular ring integral therewith, a circular ring connected to said semi-circular ring, the circular ring adapted to embrace the other handle, each of said shanks having a slot therein, pins held in said slots, said pins being adapted to hold a saw.

HENRY L. TRIPOD.

Witnesses:
J. H. MULFORD,
J. L. MONROE.

Copies of this patent may be obtained for five cents each, by addressing the "Commissioner of Patents, Washington, D. C."